Jan. 18, 1966 A. FREISE 3,230,317

FLEXIBLE COUPLING ARRANGEMENT FOR PHONOGRAPH PICKUP

Filed Dec. 8, 1960

INVENTOR

August Freise

BY George H Spencer

United States Patent Office 3,230,317

Patented Jan. 18, 1966

3,230,317

FLEXIBLE COUPLING ARRANGEMENT FOR PHONOGRAPH PICKUP

August Freise, Hannover, Germany, assignor to Telefunken Aktiengesellschaft, Berlin, Germany Filed Dec. 8, 1960, Ser. No. 74,701
16 Claims. (Cl. 179—100.41)

The present invention relates to a coupling arrangement for the stylus carrier in a pickup arrangement, particularly a stereo pickup arrangement.

In stereo phonograph pickups, the stylus carrier should be so mounted that the restoring force necessary to return the stylus is as small and as constant as possible for all directions in which the stylus can move. It is known to clamp one end of the stylus carrier and to transmit the deflecting movements, which occur when the stylus scans the record, to a transducer system by way of a coupling element. In this known type of system, the stylus carrier which, usually, is in the form of a leaf spring or in the form of a metallic tube, had a clamped or gripped end which is either screwed in place or is received in rubber parts. The usual structural means which are used to prevent the stylus from turning about its own axis as well as from becoming loose for movement in longitudinal direction have an adverse effect on the cylinder symmetry of the carrier and do not fulfill the requirements insofar as small restoring force is concerned.

It is, therefore, an object of the present invention to provide a stylus carrier which overcomes the above disadvantages and, with this object in view, the present invention resides mainly in a pickup arrangement, particularly pickups for stereo equipment, in which a cylindrical and preferably tubular stylus carrier is provided, whose deflections under the influence of the stylus carried at the free end are transmitted to the mounting element of a pickup capsule or other transducer system, wherein a cylindrical plastic holding element is interposed between and connected to both the stylus carrier and the mounting element, which holding element, in response to deflections of the stylus, is subjected substantially exclusively to bending forces.

Additional objects and advantages of the present invention will become apparent upon consideration of the following description when taken in conjunction with the accompanying drawings, in which.

Figure 1:
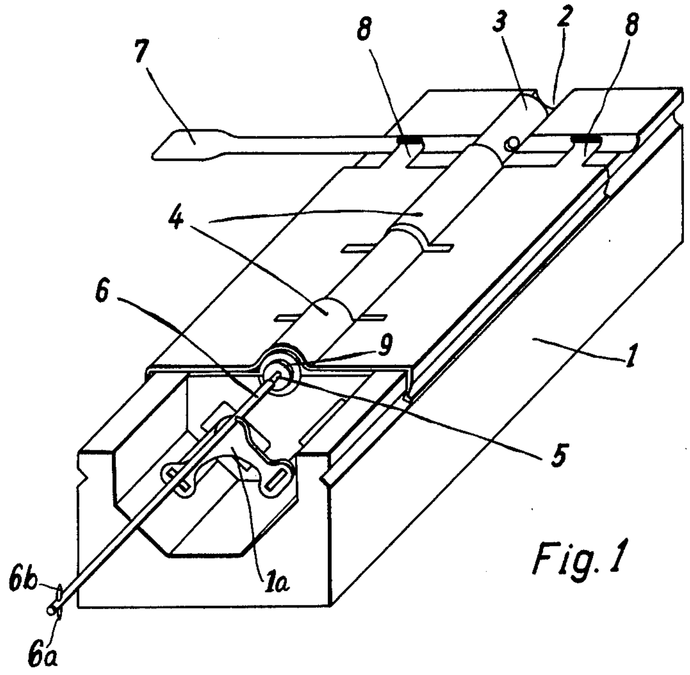
FIGURE 1 is a perspective view of a stereo pickup capsule wherein the stylus carrier is held in accordance with the present invention.
Figures 2, 3, 4, 5:
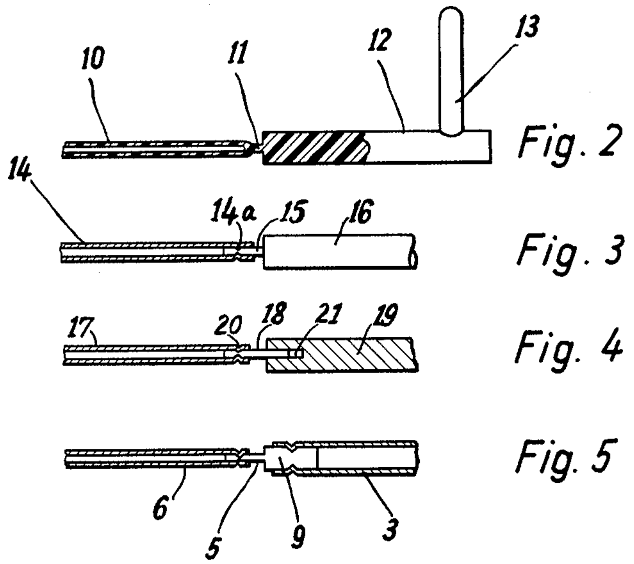
FIGURES 2 to 5 are sectional views of various embodiments of holding elements between stylus carriers and mounting elements according to the present invention, with the particular embodiment of FIGURE 5 being the one used in the capsule shown in FIGURE 1.

Referring now to the drawings and to FIGURES 1 and 5 thereof in particular, there is shown a stereo pickup capsule comprising a capsule housing 1 having a semi-circular groove 2 within which a tubular cylindrical mounting element 3 is held in place by means of a mounting plate 4. A resilient plastic holding element 5, onto which the rear end of a metallic tubular stylus carrier 6 is slipped, has an enlarged portion 9 which is received within the end of the tubular element 3. This holding element 5, it will be appreciated, serves solely as a holding or attaching means, in the sense that, in a pick-up capsule of the type involved, no motion is to be transmitted from the stylus carrier 6 to the tubular mounting element 3, the latter being, as the name implies, simply a device for mounting the stylus carrier. Accordingly, the term "holding element," as used throughout the instant specification and claims, is intended to refer to an element which serves to hold or attach the stylus carrier to the mounting element, rather than as an element for transmitting a force from the stylus carrier to the mounting element. As is best shown in FIGURE 5, the mounting end of the stylus carrier 6 and the holding element 5 are crimped together, as are the end of the tubular element 3 and the portion 9 of element 5, so that the parts 6 and 3 will be firmly seated on the holding element 5.

A handle 7 is connected to the rear end of the element 3 so that the element 3, together with the stylus carrier, can be rotated 180° so that either one of the two styli *6a*, *6b* can be brought into operative position.

It will be appreciated, however, that during actual operation, i.e., except during change-over from one of the styli to the other, the mounting element 3 remains stationary. The mounting plate 4 is formed with two projecting portions 8 which act as detents that hold the handle 7 in its two rest positions, corresponding to positions of the stylus carrier 6 wherein one of the two styli *6a*, *6b* will be in its operative position. A bearing 1*a* is provided for supporting the stylus carrier 6 near its rear end, it being this bearing which serves to transmit the vibrations of the stylus carrier 6 to the transducer (not shown) which transforms the mechanical vibration into electrical oscillations.

The plastic holding element may, for example, be polyethylene or polypropylene; the polypropylene known as "Hostalen PPH" is particularly useful. Such plastics are elastic, as well as very tough, and they have a large internal friction which has a good effect insofar as the free oscillation of the stylus is concerned.

In the embodiment of FIGURE 2, the stylus carrier 10, the holding element 11, the cylindrical mounting element 12, and the position adjusting handle 13 are all molded into one integral part.

In the embodiment of FIGURE 3, the stylus carrier 14 is a metallic tube which is slipped over the end of the holding element 15 which is integral with the cylindrical element 16, the parts 14 and 15 being locked or otherwise secured to each other by creasing or crimping indicated at 14*a*. If desired, the position-adjusting handle (not shown in FIGURE 3) may likewise be made integral with the elements 15 and 16, as described above in connection with FIGURE 2.

In the embodiment of FIGURE 4, the tubular stylus carrier 17 is slipped over the resilient holding element 18 which is inserted into a bore of a metal rod 19 constituting the mounting element, the parts 17 and 18 being locked together as shown at 20, and the parts 18 and 19 being locked together as shown at 21.

Instead of crimping the parts together, a firm attachment can be obtained in any other suitable way, as for example, by gluing, shrink-fitting, riveting, or screwing.

It will be understood that the above description of the present invention is susceptible to various modifications, changes and adaptations, and the same are intended to be comprehended within the meaning and range of equivalents of the appended claims.

I claim:

1. In a pickup arrangement, the combination which comprises: a stylus carrier carrying a stylus; a stationary pickup capsule; and a cylindrical plastic holding element interposed between and connected to both said stylus carrier and said pickup capsule, said holding element extending beyond the end of the pickup capsule toward said stylus carrier, the end of said stylus carrier which is nearest to said pickup capsule being outside of the end of said pickup capsule in consequence of which said holding element is, upon deflection of the stylus, subjected exclusively to bending forces.

2. In a pickup arrangement, the combination which comprises: an elongated tubular stylus carrier carrying at one end thereof a stylus; a pickup capsule having a stationary mounting element one end of which is directed toward said stylus carrier; and a cylindrical plastic holding element connected to the opposite end of said stylus carrier as well as to said mounting element of said pickup capsule, said holding element extending beyond said one end of said mounting element toward said opposite end of said stylus carrier, said stylus carrier being spaced from said mounting element, in the direction of the length of said holding element, in consequence of which said holding element is, upon deflection of the stylus, subjected exclusively to bending forces.

3. The combination defined in claim 2 wherein said stylus carrier is made of metal and is secured to said holding element.

4. The combination defined in claim 3 wherein said stylus carrier is crimped to said holding element.

5. The combination defined in claim 3 wherein said stylus carrier is glued to said holding element.

6. The combination defined in claim 3 wherein said stylus carrier is shrunk onto said holding element.

7. The combination defined in claim 2 wherein said mounting element is a metallic tube which is rotatably mounted on said pickup capsule.

8. The combination defined in claim 7 wherein said mounting element is crimped to said holding element.

9. The combination defined in claim 7 wherein said mounting element is glued to said holding element.

10. The combination defined in claim 7 wherein said mounting element is shrunk onto said holding element.

11. The combination defined in claim 2 wherein said stylus carrier, said holding element, and said mounting element are constituted by an integral piece.

12. The combination defined in claim 11 wherein said mounting element is rotatably supported by said capsule, and wherein said integral piece also includes a handle extending radially from said mounting element.

13. The combination defined in claim 2 wherein said stylus carrier is made of metal, and wherein said holding and mounting elements are integral with each other.

14. The combination defined in claim 2 wherein said stylus carrier and said mounting element are made of metal, said mounting element being a solid rod formed at one end with a bore within which said holding element is received.

15. The combination defined in claim 2 wherein said mounting element is also tubular and wherein both said stylus carrier and said mounting element are made of metal.

16. The combination defined in claim 2 wherein said holding element is made of a material selected from the group consisting of polyethylene and polypropylene.

References Cited by the Examiner

UNITED STATES PATENTS

| | | | |
|---|---|---|---|
| 2,869,339 | 1/1959 | Drake | 287—85 XR |
| 2,934,610 | 4/1960 | Dieter | 179—100.41 |

IRVING L. SRAGOW, *Primary Examiner.*

STEPHEN W. CAPELLI, *Examiner.*